United States Patent
Hayakawa et al.

(10) Patent No.: US 10,144,467 B2
(45) Date of Patent: Dec. 4, 2018

(54) VEHICLE BODY MANUFACTURING APPARATUS

(71) Applicant: Fuji Jukogyo Kabushiki Kaisha, Tokyo (JP)

(72) Inventors: Naoki Hayakawa, Tokyo (JP); Noboru Sakamoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/003,660

(22) Filed: Jan. 21, 2016

(65) Prior Publication Data
US 2016/0229471 A1 Aug. 11, 2016

(30) Foreign Application Priority Data
Feb. 10, 2015 (JP) .................................. 2015-024527

(51) Int. Cl.
*B23K 37/04* (2006.01)
*B62D 65/02* (2006.01)

(52) U.S. Cl.
CPC ........ *B62D 65/026* (2013.01); *B23K 37/0443* (2013.01)

(58) Field of Classification Search
CPC .... B23K 37/0443; B23K 37/04; B62D 65/02; B62D 65/026
See application file for complete search history.

(56) References Cited

U.S. PATENT DOCUMENTS

| | | | | |
|---|---|---|---|---|
| 2,779,092 A | * | 1/1957 | Gordon | B23K 37/047 269/37 |
| 4,256,947 A | * | 3/1981 | De Candia | B23K 37/047 219/79 |
| 4,392,601 A | * | 7/1983 | Fujikawa | B23K 37/047 228/4.1 |
| 4,600,136 A | * | 7/1986 | Sciaky | B23K 37/047 228/4.1 |
| 4,606,488 A | * | 8/1986 | Yanagisawa | B23K 11/10 219/125.11 |

(Continued)

FOREIGN PATENT DOCUMENTS

| | | | | |
|---|---|---|---|---|
| DE | 19533389 A1 | * | 3/1997 | ......... B23K 37/0435 |
| DE | 102007024589 A1 | * | 11/2008 | ........... B23K 37/047 |

(Continued)

OTHER PUBLICATIONS

JPO Decision to Grant dated Feb. 7, 2017 with an English translation thereof.

(Continued)

*Primary Examiner* — Joseph J Hail
*Assistant Examiner* — Arman Milanian
(74) *Attorney, Agent, or Firm* — McGinn I. P. Law Group, PLLC.

(57) ABSTRACT

A vehicle body manufacturing apparatus includes upper jig frames having frame members that are paired with each other and are insertable into the inside of the vehicle body through respective left and right openings of the vehicle body, a coupling mechanism that freely couples and decouples the ends of the paired frame members, and a clamp mechanism that is supported on the upper jig frame and positions the vehicle body from the inside of the vehicle body.

9 Claims, 9 Drawing Sheets

(56) References Cited

U.S. PATENT DOCUMENTS

| | | | | |
|---|---|---|---|---|
| 4,667,866 A | * | 5/1987 | Tobita | B23K 37/047 219/79 |
| 4,795,075 A | * | 1/1989 | Pigott | B23K 37/047 219/80 |
| 5,267,683 A | * | 12/1993 | Hamada | B23K 37/0235 228/4.1 |
| 5,374,799 A | * | 12/1994 | Nishimoto | B62D 65/02 219/117.1 |
| 5,902,496 A | * | 5/1999 | Alborante | B23K 37/047 219/158 |
| 6,115,907 A | * | 9/2000 | Beyer | B23K 37/0443 269/152 |
| 6,250,533 B1 | * | 6/2001 | Otterbein | B62D 65/18 219/158 |
| 2003/0037432 A1 | * | 2/2003 | McNamara | B62D 65/02 29/771 |
| 2006/0013646 A1 | * | 1/2006 | Baulier | B23K 37/04 403/326 |

FOREIGN PATENT DOCUMENTS

| | | | | |
|---|---|---|---|---|
| JP | H05-162668 A | | 6/1993 | |
| JP | H 06-59851 B2 | | 8/1994 | |
| JP | H08-066834 A | | 3/1996 | |
| JP | 2001-179555 A | | 7/2001 | |
| JP | 2006-027424 A | | 2/2006 | |
| JP | 2011-143521 A | | 7/2011 | |
| JP | 2011143521 A | * | 7/2011 | B23P 21/00 |
| WO | WO 2008145286 A1 | * | 12/2008 | B23K 37/047 |

OTHER PUBLICATIONS

JPO Notification of Refusal dated Oct. 4, 2016 with English translation thereof.

* cited by examiner

VEHICLE BODY MANUFACTURING APPARATUS

CROSS-REFERENCE TO RELATED APPLICATIONS

The present application claims priority from Japanese Patent Application No. 2015-024527 filed on Feb. 10, 2015, the entire contents of which are hereby incorporated by reference.

BACKGROUND

1. Technical Field

The present invention relates to a vehicle body manufacturing apparatus that temporarily assembles a vehicle body by welding a workpiece to another workpiece in a temporarily secured body.

2. Related Art

Various techniques have been proposed and implemented for assembling a vehicle body by positioning and performing spot welding on a plurality of workpieces constituting the vehicle body.

Japanese Examined Patent Application Publication (JP-B) No. H06-59851, for instance, discloses a technique whereby two or more types of vehicle bodies in which shapes of clamp positions are unified among vehicle types are assembled using a vehicle body manufacturing apparatus that includes triaxial changeover units, as clamp apparatuses for positioning a body side and a roof, that are supported so as to be suspended from both sides of an upper frame, respectively, in a vehicle body assembly station and triaxial changeover units, as clamp apparatuses for positioning a body side and an underbody, that are disposed on both sides of a lower frame, respectively, in the vehicle assembly station.

In the vehicle body manufacturing apparatus as disclosed in JP-B No. H06-59851, however, clamp jigs for positioning a workpiece on a vehicle body are typically supported from the outside of the vehicle body by the triaxial changeover units, articulated robots, and the like disposed on the side of the vehicle body. As a result, when preliminary assembly and welding are performed, various mechanical sections for supporting the clamp jigs and the likes are disposed on the side of the vehicle body, which may impede movement of welding guns to welding locations.

SUMMARY OF THE INVENTION

It is desirable to provide a vehicle body manufacturing apparatus that is capable of positioning a workpiece in a vehicle body as well as making a working space on the side of the vehicle body.

An aspect of the present invention provides a vehicle body manufacturing apparatus includes an upper jig frame including of frame members that are paired with each other and are insertable into the inside of the vehicle body through left and right openings of the vehicle body, respectively, a coupling mechanism that freely couples and decouples the ends of the paired frame members, and a clamp mechanism that is supported on the upper jig frame and positions the vehicle body from the inside of the vehicle body.

DETAILED DESCRIPTION

Figure 1:
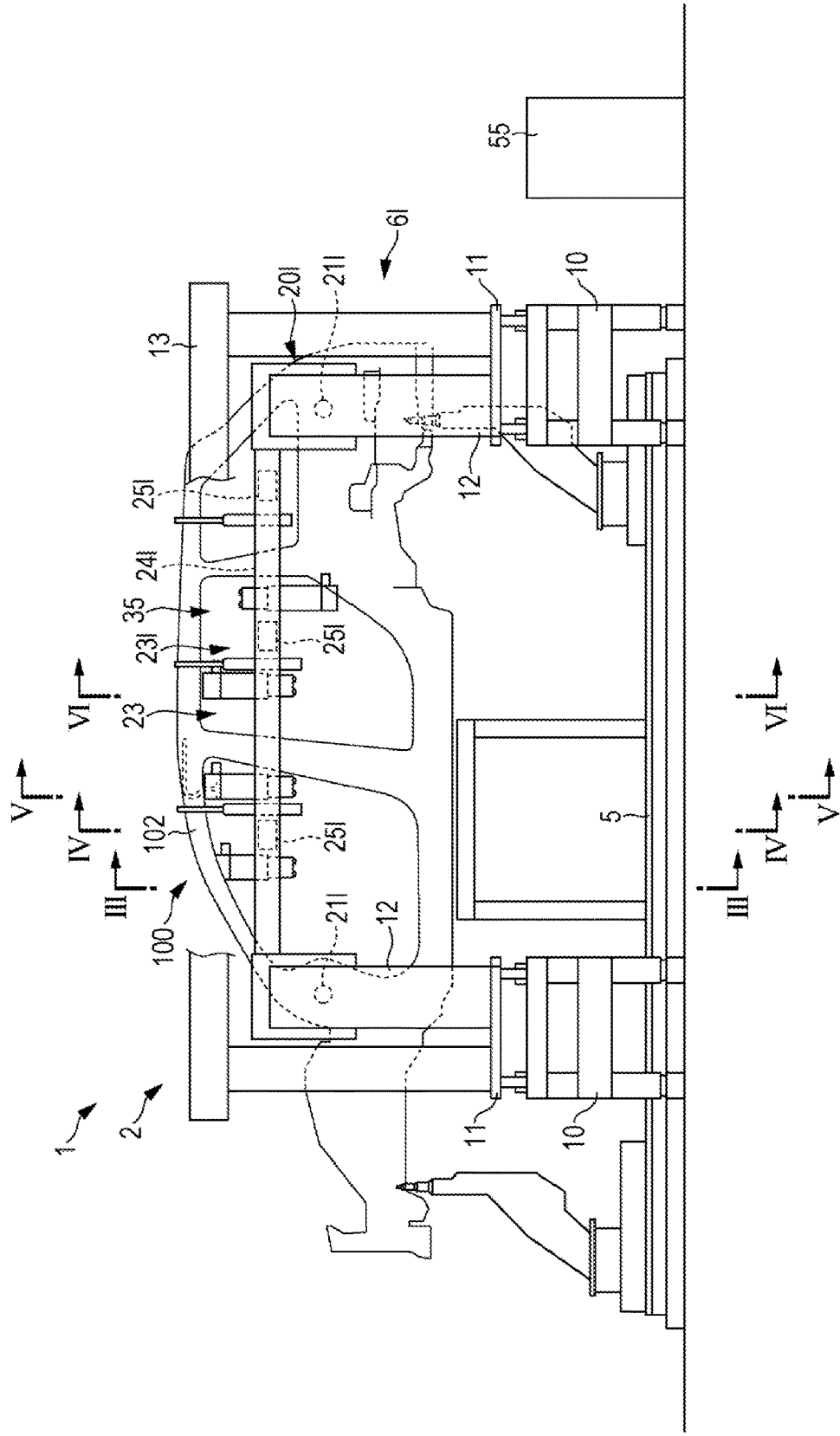
FIG. 1 is a side view schematically illustrating a configuration of a vehicle body manufacturing apparatus.
Figure 2:
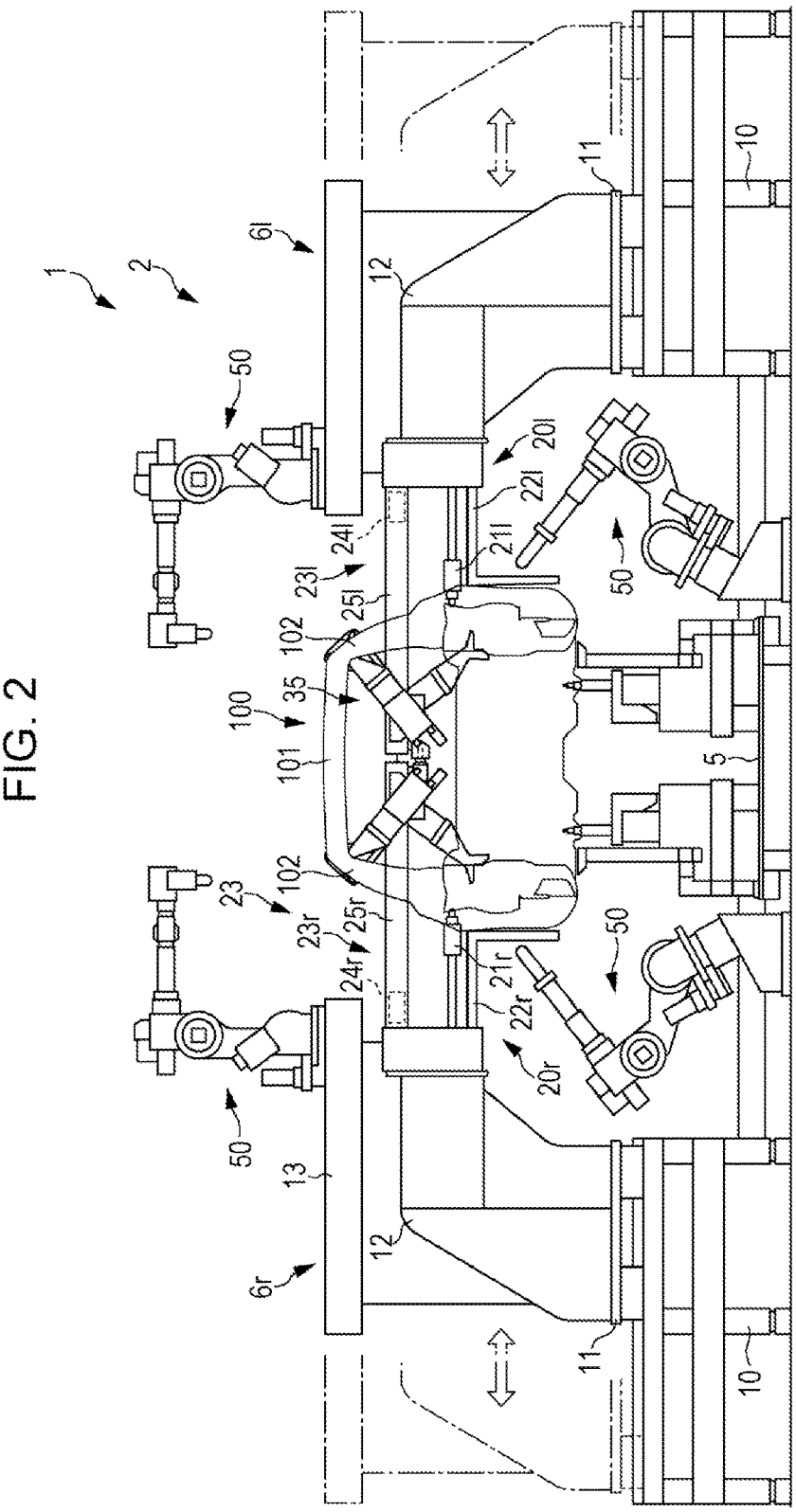
FIG. 2 is a front view schematically illustrating a configuration of the vehicle body manufacturing apparatus.
Figure 3:
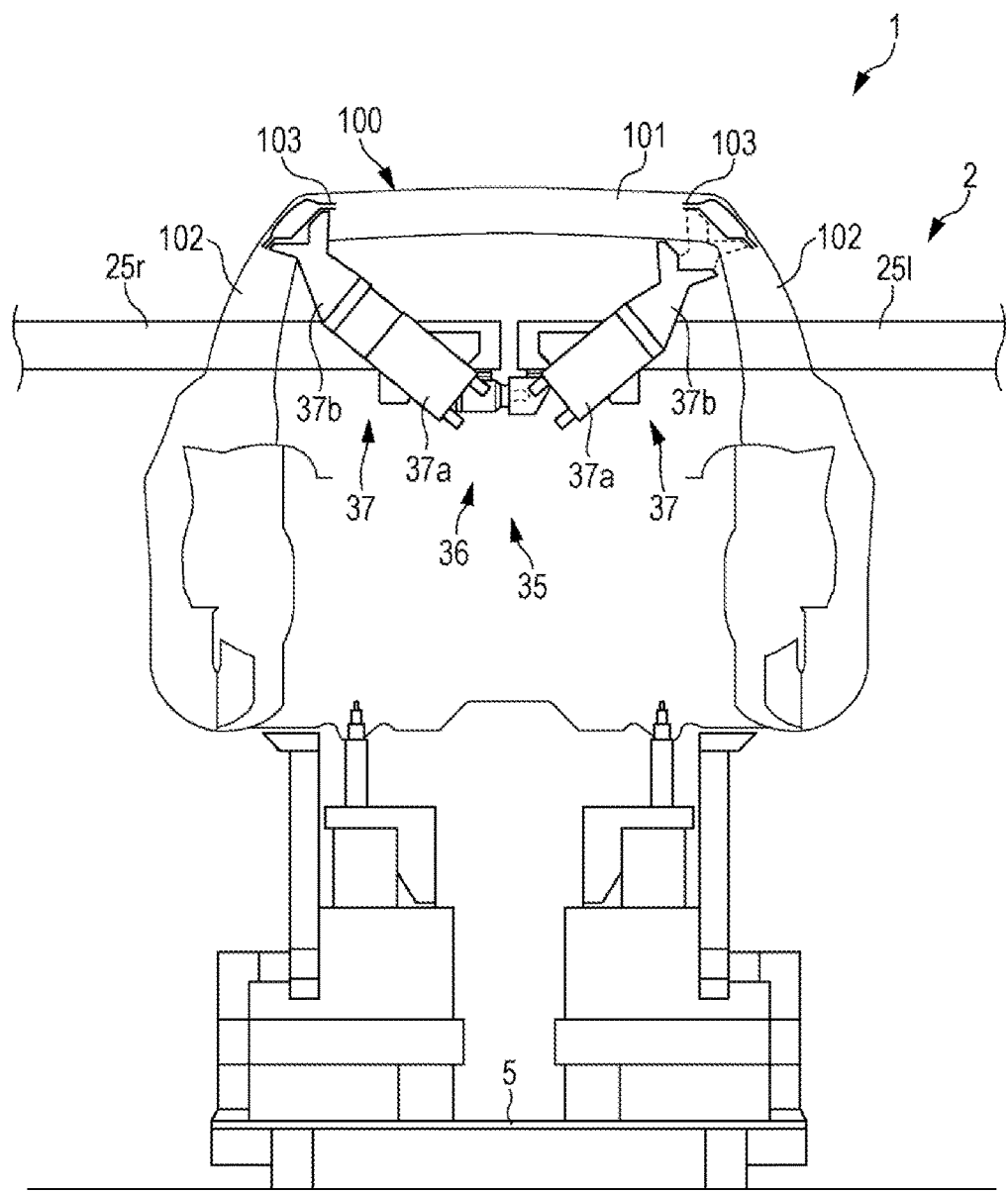
FIG. 3 is a cross-sectional view as taken along line III-III of FIG. 1.
Figure 4:
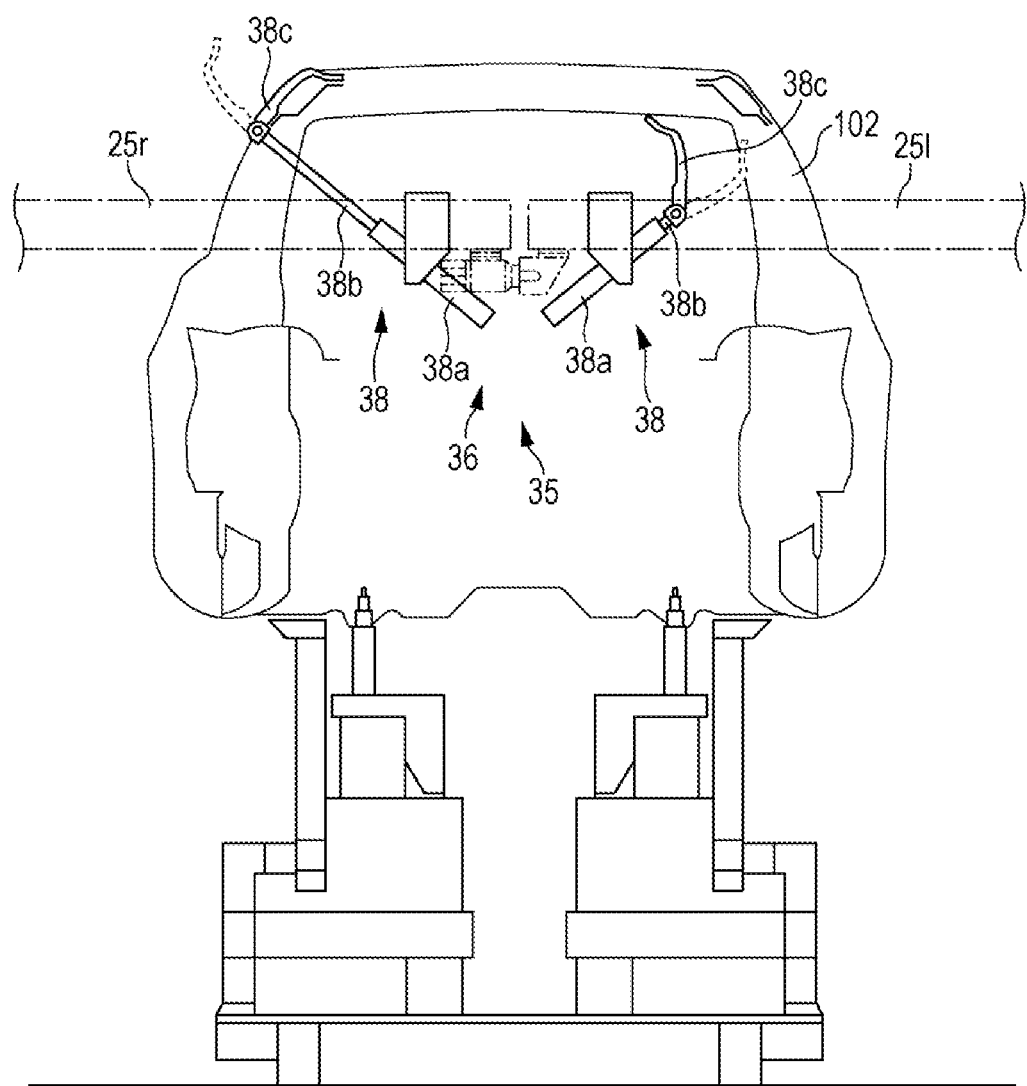
FIG. 4 is a cross-sectional view as taken along line IV-IV of FIG. 1.
Figure 5:
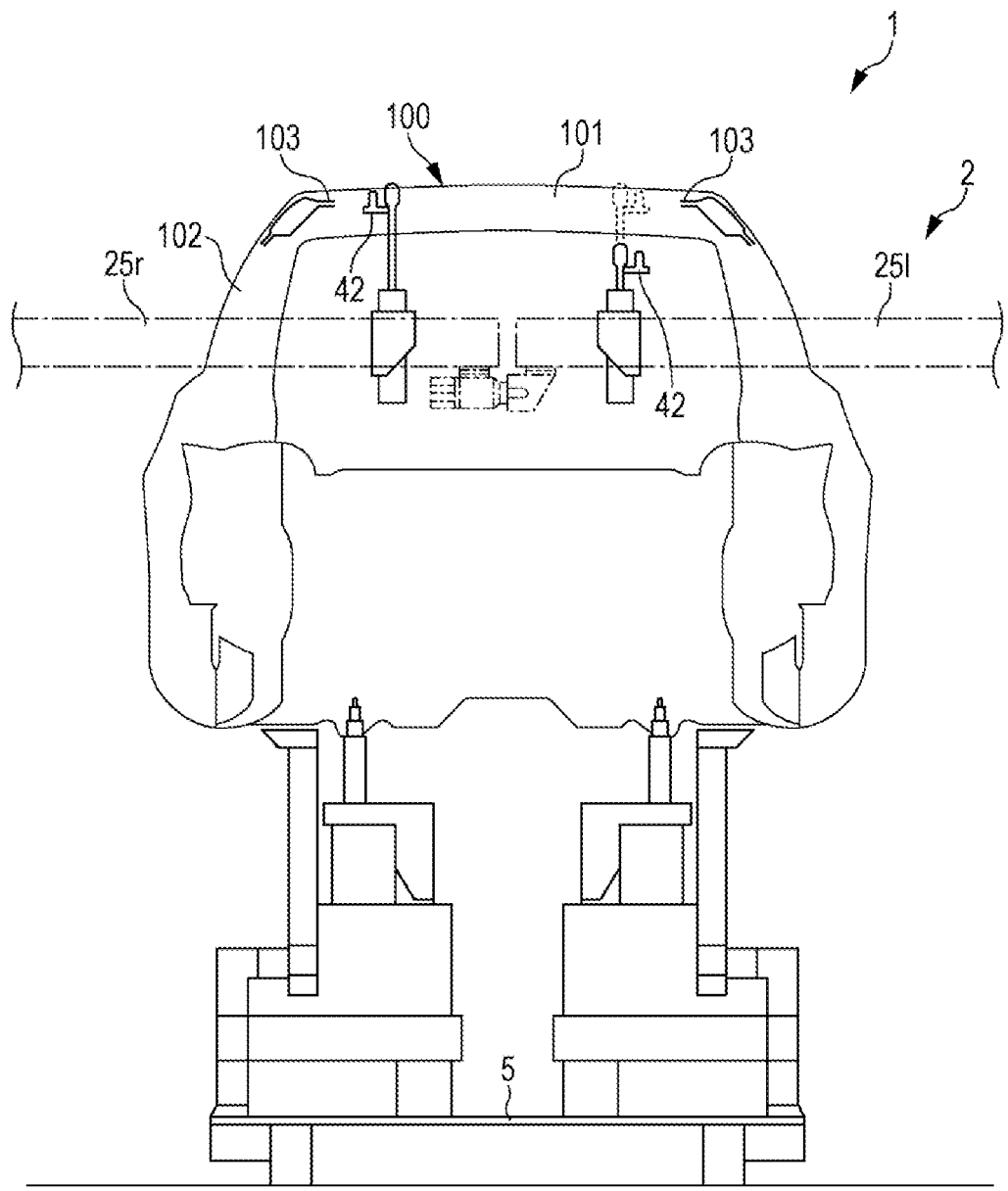
FIG. 5 is a cross-sectional view as taken along line V-V of FIG. 1.
Figure 6:
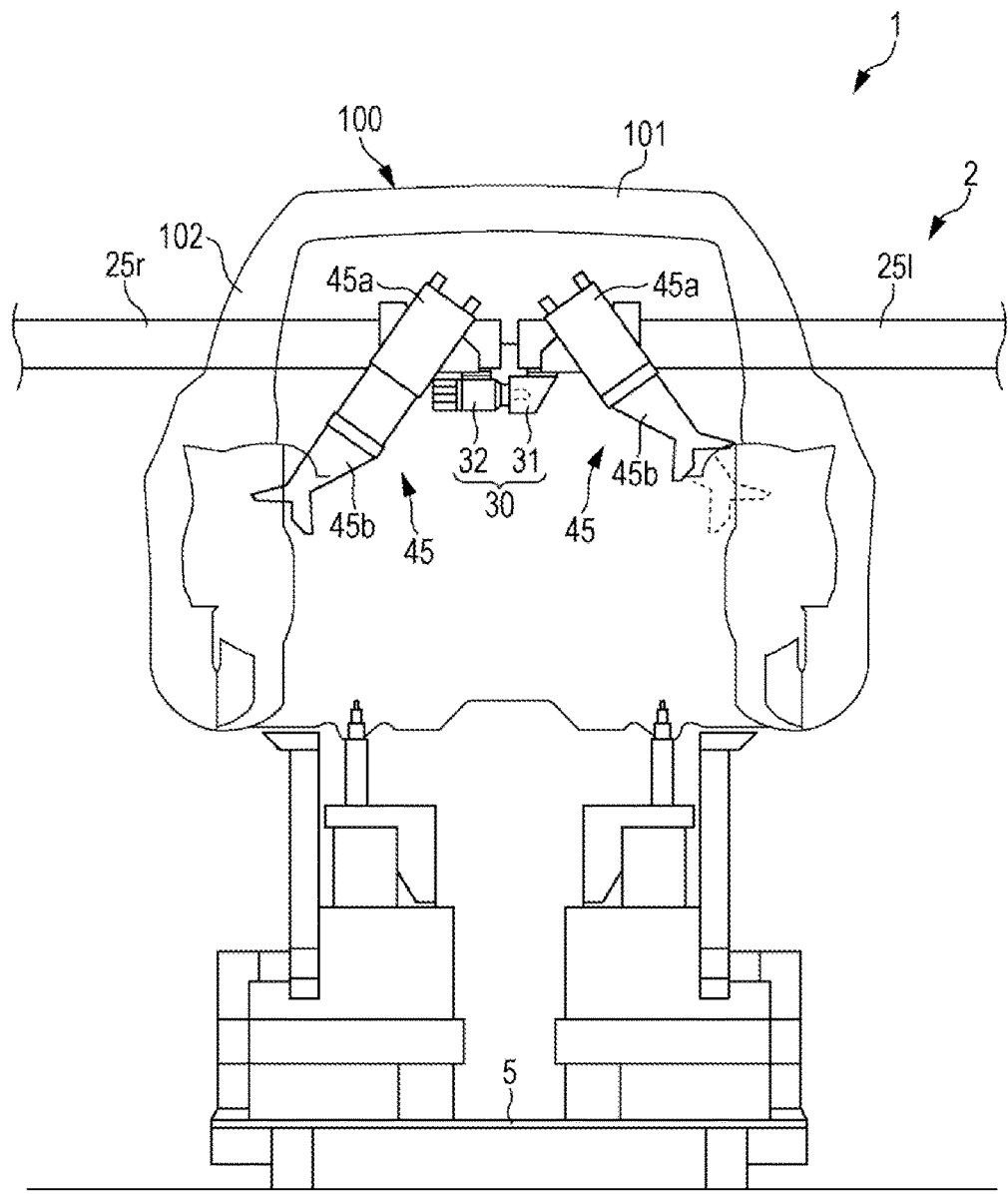
FIG. 6 is a cross-sectional view as taken along line VI-VI of FIG. 1.
Figure 7:
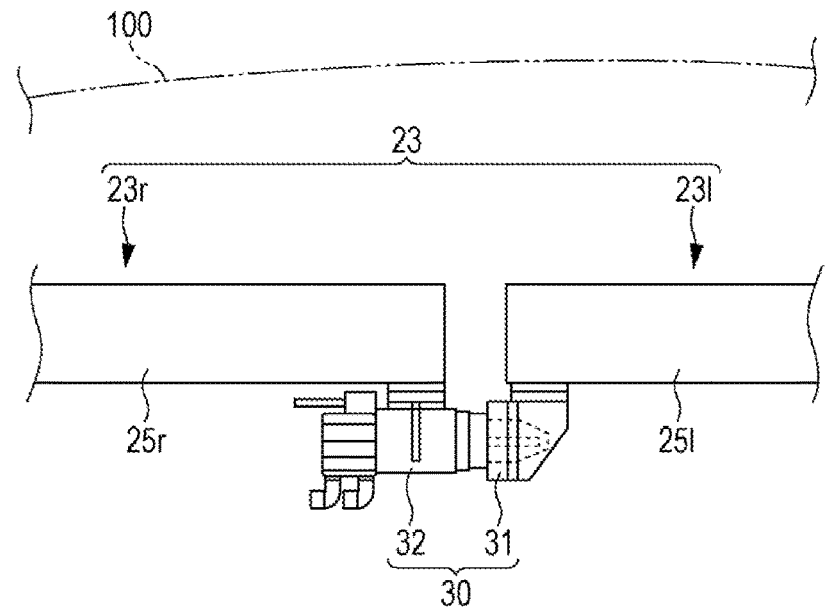
FIG. 7 is a front view of a coupling member.
Figure 8:
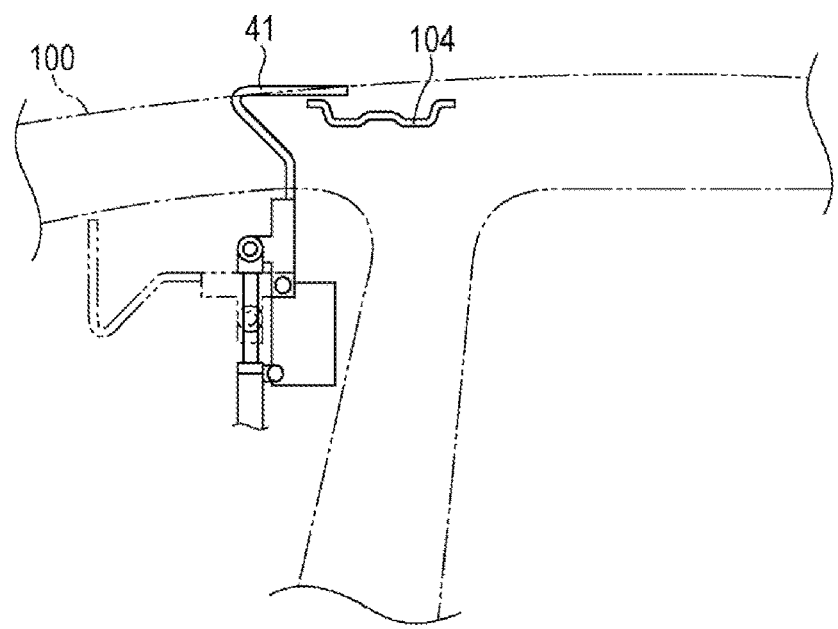
FIG. 8 is a side view of an upper clamp jig.
Figure 9:
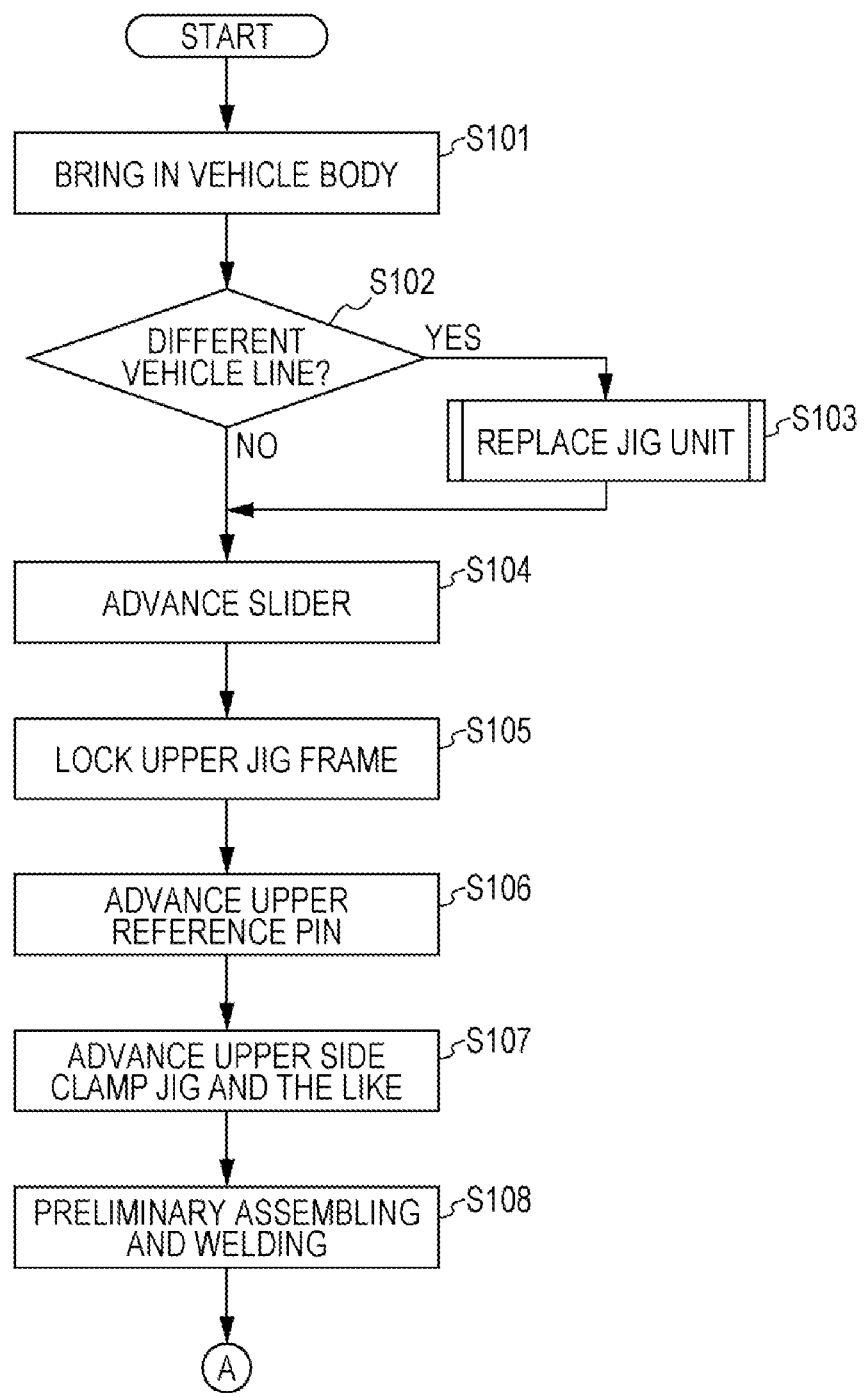
FIG. 9 is a flowchart (No. 1) illustrating a preliminary assembly and welding process for side structures.
Figure 10:
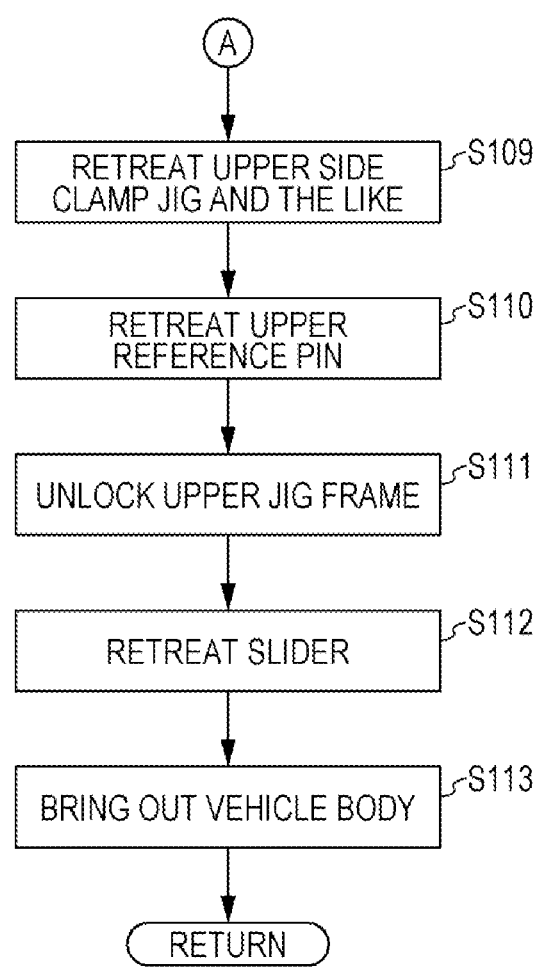
FIG. 10 is a flowchart (No. 2) illustrating a preliminary assembly and welding process for side structures.

An example of the present invention will be described below with reference to the attached drawings. FIG. 1 is a side view schematically illustrating a configuration of a vehicle body manufacturing apparatus according to the example of the present invention. FIG. 2 is a front view schematically illustrating a configuration of the vehicle body manufacturing apparatus. FIG. 3 is a cross-sectional view as taken along line III-III of FIG. 1. FIG. 4 is a cross-sectional view as taken along line IV-IV of FIG. 1. FIG. 5 is a cross-sectional view as taken along line V-V of FIG. 1. FIG. 6 is a cross-sectional view as taken along line VI-VI of FIG. 1. FIG. 7 is a front view of a coupling member. FIG. 8 is a side view of an upper clamp jig. FIGS. 9 and 10 are flowcharts illustrating a preliminary assembly and welding process for side structures.

A vehicle body manufacturing apparatus 1 illustrated in FIGS. 1 and 2 is configured in, for instance, a stage of a preliminary assembly and welding process set up on a motor vehicle main body assembly line. A vehicle body 100 having side structures 102 as side components temporarily secured to both sides of a center structure 101 as a lower central structural component is secured to (or clamped with) an underfloor jig 5 and is carried by a shuttle conveyor (not illustrated) to a stage of the assembly process.

The center structure 101 is specifically composed of, for instance, a front-wheel apron, a toe board, a front floor, a rear-wheel apron, and the like. Each of the side structures 102 is specifically composed of, for instance, a front pillar, a center pillar, a rear-quarter pillar, a side rail, a side sill, and the like.

In the stage of the assembly process, left and right slider mechanisms 6*l*, 6*r* are provided so as to be opposed to the left and right side structures 102 of the vehicle body 100, respectively. As illustrated in, for instance, FIGS. 1 and 2, the left and right slider mechanisms 6*l*, 6*r* respectively include bases 10 located on and secured to the stage, sliders 11 supported by the bases 10 so as to freely advance to and/or retreat from (or be freely moveable between) the sides of the vehicle body 100, posts 12 secured to the sliders 11, and racks 13 that are secured to the sliders 11 and extend over the posts 12 in the longitudinal direction of the vehicle body 100.

The posts 12 for the left and right slider mechanisms 6*l*, 6*r* hold left and right jig units 20*l*, 20*r*, respectively, that are replaceable according to the vehicle type of the vehicle body 100. A set of the left and right jig units 20*l*, 20*r* chosen from several types of jig units is illustrated in FIG. 1 and is collectively referred to as jig units 20 in the following descriptions.

The left and right jig units 20*l*, 20*r* can be selectively transferred by an upper jig transfer robot (not illustrated) from a jig storage space (not illustrated) so as to be supported by the posts 12.

As illustrated in FIGS. 1 and 2, the left and right jig units 20*l*, 20*r* respectively include left and right jig reference pins 21*l*, 21*r* that position the vehicle body 100 through engagement with the side structures 102 when the posts 12 advance, left and right contact jigs 22*l*, 22*r* that hold the lower parts of the vehicle body 100 through coming into contact with the lower parts of the side structures 102 when the posts 12 advance, and left and right upper jig frames 23*l*, 23*r* having frame members 25 that are inserted into the inside of the vehicle body 100 when the posts 12 advance.

As illustrated in FIG. 1, the left and right upper jig frames 23*l*, 23*r* respectively include jig frame main bodies 24*l*, 24*r* that are supported by the posts 12 and extend in the longitudinal direction of the vehicle body 100 and a plurality of (for instance, three sets of) frame members 25*l*, 25*r* extending inward in the lateral direction of the vehicle body from the jig frame main bodies 24*l*, 24*r*.

The left and right frame members 25*l*, 25*r* are paired so as to be opposed to each other between the left and right upper jig frames 23*l*, 23*r* and are inserted into the vehicle body 100 through respective left and right openings of the vehicle body 100. Specifically, (for instance, three sets of) the frame members 25*l*, 25*r* are respectively inserted into a front door opening between an A-pillar and a B-pillar of the side structure 102, a rear door opening between the B-pillar and a C-pillar, and a rear window opening between the C-pillar and a D-pillar.

The frame member 25*l* of the left upper jig frame 23*l* and the frame member 25*r* of the right upper jig frame 23*r* as a whole have a coupling mechanism 30 at ends thereof whereby the frame members 25*l*, 25*r* are coupled to each other inside the vehicle body 100. As illustrated in, for instance, FIG. 7, such a coupling mechanism 30 includes a pin clamp cylinder 31 provided on the frame member 25*l* of the left upper jig frame 23*l* and a pin hole bracket 32 provided on the frame member 25*r* of the right upper jig frame 23*r*. When the left and right frame members 25*l*, 25*r* are inserted into the vehicle body 100, the pin clamp cylinder 31 and the pin hole bracket 32 are opposed to each other inside the vehicle body 100 so as to be able to couple the frame members 25*l*, 25*r* together through engagement with each other. With this arrangement, the left and right upper jig frames 23*l*, 23*r* are coupled to each other, thereby forming an integral upper jig frame 23.

In a jig frame structure 2 having a configuration described above, frame members 25*l*, 25*r* have a clamp mechanism 35 for clamping mainly the upper part of the vehicle body 100.

Such a clamp mechanism 35 has an upper side clamp jig 36 for clamping workpieces 103 that constitute a side rail of the vehicle body 100. The upper side clamp jig 36 is a component that is stretchable from the inner side of the vehicle body 100 so as to be able to clamp the workpieces 103, including pressing jigs 37 that press the workpieces 103 of the vehicle body 100 from the inside of the body to the outside and restricting jigs 38 that restricts the movement of the workpieces 103 pressed by the pressing jigs 37 toward the outside of the vehicle body.

As illustrated in, for instance, FIG. 3, the pressing jigs 37 according to the example of the present invention respectively include cylinders 37*a* that extend outward obliquely and upwardly in the lateral direction of the vehicle body 100 and are secured to the frame members 25*l*, 25*r*, respectively, and pressing members 37*b* that are moveable through the operation of the cylinders 37*a* so as to press the workpieces 103, respectively.

As illustrated in, for instance, FIG. 4, the restricting jigs 38 respectively include cylinders 38*a* that extend outward obliquely and upwardly in the lateral direction of the vehicle body 100 and are secured to a jig frame main body, rods 38*b* that are moveable through the operation of the cylinders 38*a*, and bendable locking members 38*c* provided on ends of the rods 38*b*.

The upper side clamp jig 36 causes the pressing members 37*b* of the pressing jigs 37 to press the workpieces 103 against the vehicle body 100 from inside as well as causes the locking members 38*c* of the restricting jigs 38 to bend from the rods 38*b* so as to fix the workpieces 103 to the vehicle body 100 from outside, thereby enabling the workpieces 103 to be clamped in a specified position.

In addition to the upper side clamp jig 36 described above, the frame members 25*l*, 25*r* are provided with upper reference pins 42, respectively, which position the roof and the like of the vehicle body 100, as illustrated in, for instance, FIG. 5.

Furthermore, the frame members 25*l*, 25*r* are provided with pressing jigs 45, respectively, in order to clamp the lower part of the vehicle body 100, in addition to the upper part of the vehicle body 100, in cooperation with the contact jigs 22*l*, 22*r* or the like. As illustrated in, for instance, FIG. 6, the pressing jigs 45 according to the example of the present invention include cylinders 45*a* that extend outward obliquely and downwardly in the lateral direction of the vehicle body 100 and are secured to the frame members 25*l*, 25*r*, respectively, and pressing members 45*b* that are moveable through the operation of the cylinders 45*a* so as to press the workpieces 103, respectively.

As illustrated in, for instance, FIG. 2, welding robots 50 are disposed at key points on the side of the jig frame structure 2. The welding robots 50 according to the example of the present invention are, for instance, a one-side spot welding, a laser beam welding, or a friction stir welding (FSW) type welding robot performing welding from the outside of the vehicle body 100 and are disposed on the side of the underfloor jig 5 and on the racks 13.

With this arrangement, the manufacturing apparatus 1 has various functional sections having control panels that are integrally controlled by programs configured in a process control panel 55 whereby the preliminary assembly and welding process is performed as illustrated in, for instance, FIGS. 9 and 10.

In other words, when the vehicle body 100 is carried into the (preliminary assembly and welding) process from another process (in step S101), the process control panel 55 reads an identification code indicated on the vehicle body 100 in step S102 to determine whether the vehicle body 100 thus carried is of a different vehicle type from the preceding vehicle body 100.

If it is determined in step S102 that the vehicle body 100 thus carried is of a different vehicle type from the preceding vehicle body 100, the process control panel 55 proceeds to step S103 where the jig units 20 (left jig unit 20*l* and right jig unit 20*r*) are replaced with appropriate ones. In other words, when proceeding from step S102 to step S103, the process control panel 55 activates an upper jig transfer robot (not illustrated), removes the left and right jig units 20*l*, 20*r* held by the posts 12, and transfers the units 20*l*, 20*r* to a jig storage area. After that, the process control panel 55 moves the upper jig transfer robot to a jig storage area where jigs corresponding to the current vehicle type are stored and causes the posts 12 to hold the new left and right jig units 20*l*, 20*r* and proceeds to step S104.

On the contrary, if it is determined in step S102 that the vehicle body 100 thus carried is of an identical vehicle type to the preceding vehicle body 100, the process control panel 55 proceeds to step S104.

When proceeding from step S102 or S103 to step S104, the process control panel 55 causes the sliders 11 to advance to the vehicle body 100. This results in the vehicle body 100 being put in place through the engagement of the jig reference pins 21*l*, 21*r* with the side structures 102. At the same time, the contact jigs 22*l*, 22*r* come into contact with the side structures 102. In addition, the frame member 25*l* of the left upper jig frame 23*l* and the frame member 25*r* of the right upper jig frame 23*r* are inserted into the vehicle body 100 through its side openings.

When proceeding from step S104 to step S105, the process control panel 55 activates the pin clamp cylinder 31 of the coupling mechanism 30 to couple the frame members 25*l*, 25*r* together, thereby locking the upper jig frame 23.

When the jig frame structure 2 supporting the vehicle body 100 is assembled through the processes described above, the process control panel 55 causes the upper reference pins 42 to advance to a clamp position for the roof and the like of the vehicle body 100 in step S106.

In step S107, the process control panel 55 causes the upper side clamp jig 36 to advance to and clamp the workpieces 103. In other words, the process control panel 55 operates the cylinders 37*a* of the pressing jigs 37 to cause the pressing members 37*b* to advance to the workpieces 103 and press the workpieces 103 against the vehicle body 100 from inside. Also, the process control panel 55 operates the cylinders 38*a* of the restricting jig 38 to cause ends of the rods 38*b* to project outward from the vehicle body 100 and then bends the locking member 38*c*, thereby fixing the workpieces 103 to the vehicle body 100 from outside. In addition, the process control panel 55 operates the cylinders 45*a* of the pressing jigs 45 to cause the pressing members 45*b* to advance to the vehicle body 100 and clamps the lower part of the vehicle body 100 in cooperation with the contact jigs 22*l*, 22*r* and the like.

In step S108, the process control panel 55 operates the welding robot 50 to preliminarily assemble and weld the workpieces 103 and the like clamped by the upper side clamp jig 36. In this case, the workpieces 103, for instance, are clamped by the pressing jigs 37 and the restricting jigs 38, eliminating the need for clamping by the welding robot 50. Accordingly, preliminary assembly and welding can be performed by just one-side spot welding or the like from the outside of the vehicle body 100. In addition, the pressing jigs 37 and the restricting jigs 38 are supported by the frame members 25*l*, 25*r* inside the vehicle body 100, making a sufficient working space on the side of the vehicle body 100. This enables the continuation of additional welding following preliminary assembly and welding.

When spot welding performed on the workpieces 103 is completed, the process control panel 55 proceeds to step S109 where the pressing members 37*b* and the locking members 38*c* of the upper side clamp jig 36 are caused to move away from the workpieces 103. This releases clamping of the workpieces 103 by the upper side clamp jig 36. In addition, the process control panel 55 causes the pressing members 45*b* to move away and release clamping of the lower part of the vehicle body 100.

In step S110, the process control panel 55 causes the upper reference pins 42 to move away from the clamp position for the roof and the like of the vehicle body 100.

In step S111, the process control panel 55 activates the pin clamp cylinder 31 of the coupling mechanism 30 to decouple the frame members 25*l*, 25*r*, thereby unlocking the upper jig frame 23.

In step S112, the process control panel 55 causes the sliders 11 to move away from the vehicle body 100. This results in the disengagement of the jig reference pins 21*l*, 21*r* from the side structure 102 and, at the same time, cancellation of the contact of the contact jigs 22*l*, 22*r* with the side structure 102. In addition, the frame members 25*l*, 25*r* of the left and right upper jig frames 23*l*, 23*r* move away from the side openings of the vehicle body 100.

In step S113, the process control panel 55 removes the vehicle body 100 together with the underfloor jig 5 and exits the routine.

According to the example of the present invention described above, the manufacturing apparatus 1 for the vehicle body 100, including the upper jig frame 23 (the left upper jig frame 23*l* and the right upper jig frame 23*r*) having the left and right frame members 25*l*, 25*r* that are paired with each other and are insertable into the inside of the vehicle body 100, the coupling mechanism 30 that couples or decouples the ends of the paired frame members 25*l*, 25*r*, and the clamp mechanism 35 that is supported on the upper jig frame 23 and positions the vehicle body 100 from the inside of the vehicle body 100, can make a working space on the side of the vehicle body 100 and precisely position the workpieces 103 of the vehicle body 100.

In other words, the upper jig frame 23 is divided into and is formed of the left upper jig frame 23*l* and the right upper jig frame 23*r* that are paired with each other and can be coupled or decoupled through the coupling mechanism 30. By doing this, the frame members 25*l*, 25*r* that are paired with each other are configured to be insertable into the vehicle body 100 through its side openings. In addition, the clamp mechanism 35 for positioning the vehicle body 100 is supported on the frame members 25*l*, 25*r* that are inserted into the inside of the vehicle body 100, thereby making a sufficient working space on the side of the vehicle body 100 and enabling the workpieces 103 of the vehicle body 100 to be precisely positioned.

With this arrangement, the welding robot 50 or the like can be moved to a welding position of the workpieces 103 from any direction and angle, thereby enabling preliminary assembly and welding to be performed with a high degree of workability. In addition, additional welding following preliminary assembly and welding can be implemented within the same process, if needed, because of the sufficient working space made on the side of the vehicle body 100.

In particular, the upper jig frame 23 is divided into the left upper jig frame 23*l* and the right upper jig frame 23*r* in the lateral direction of the vehicle body 100, thereby creating a sufficient space for moving the vehicle body 100 into and out of the assembly process.

The division of the upper jig frame 23 in the lateral direction makes the frame members 25*l*, 25*r* shorter, compared with division in the longitudinal direction, whereby a stroke for the movement of the left and right upper jig frames 23*l*, 23*r* can be set to be shorter. This arrangement makes it possible for the left and right frame members 25*l*, 25*r* to improve their better positioning accuracy as well as helps implement a space-saving manufacturing apparatus in a factory.

The upper jig frame 23 is formed of the left upper jig frame 23l and the right upper jig frame 23r that are coupled to each other, avoiding a cantilever support structure for the upper jig frame 23. This helps improve the accuracy in positioning the workpieces 103 through the use of the clamp mechanism 35.

The above preferred example is an instance of the preferred examples of this present invention, but the present invention is not limited to this. Various modifications are conceivable within the scope of the present invention.

The invention claimed is:

1. A vehicle body manufacturing apparatus, comprising:
at least one upper jig frame including a first frame member and a second frame member that are paired with each other and are insertable into an inside of a vehicle body through respective left and right openings of the vehicle body, the first frame member comprising a first end in a longitudinal direction of the first frame member, the second frame member comprising, a second end in the longitudinal direction, the first member and the second member having substantially a same length in the longitudinal direction;
a coupling mechanism including a first coupling portion attached to the first end, and a second coupling portion attached to the second end and configured to be freely coupled and decoupled to the first coupling portion, the coupling mechanism being configured to couple and decouple the first end and the second end by the first coupling portion and the second coupling portion; and
a clamp mechanism that is supported on the at least one upper jig frame and configured to clamp a workpiece with respect to the vehicle body,
wherein the clamp mechanism comprises:
a restricting jig, comprising:
a first extendable portion that includes a first proximal end portion attached to the first frame member and a first distal end portion opposed to the first proximal end portion, and is adjustable in a first distance from the first proximal end portion to the first distal end portion in an extending direction; and
a bendable locking member attached to the first distal end portion and configured to bend with respect to the extending direction and to contact with a first face of the workpiece; and
a pressing jig, comprising:
a second extendable portion that includes a second proximal end portion attached to the first frame member and a second distal end portion opposed to the second proximal end portion, and is adjustable in a second distance from the second proximal end portion to the second distal end portion in the extending direction; and
a pressing member attached to the second distal end portion and configured to press a second face of the workpiece opposed to the first face toward the first face, and
wherein, in a perpendicular direction with respect to the longitudinal direction, at least a part of the first proximal portion and at least a part of the second proximal portion are disposed adjacent to the first coupling portion.

2. The vehicle body manufacturing apparatus according to claim 1, wherein the pressing jig is configured to press the workpiece of the vehicle body from the inside of the vehicle body to an outside of the vehicle body and the restricting jig is configured to restrict a movement of the workpiece pressed by the pressing jig toward the outside of the vehicle body.

3. The vehicle body manufacturing apparatus according to claim 1, wherein the first frame member and the second frame member are replaceable according to a vehicle type.

4. The vehicle body manufacturing apparatus according to claim 2, wherein the first frame member and the second frame member are replaceable according to a vehicle type.

5. The vehicle body manufacturing apparatus according to claim 1, wherein the first extendable portion comprises a first cylinder and a first rod moved by the first cylinder that are disposed between the first proximal end portion and the first distal end portion, and is configured to move the bendable locking member toward the workpiece.

6. The vehicle body manufacturing apparatus according to claim 1, wherein the first extendable portion comprises:
a first cylinder that extends outwardly obliquely and upwardly in a lateral direction of the vehicle body and is secured to the second frame member; and
a first rod that is moveable through an operation of the first cylinder, and
wherein the bendable locking member is provided on an end of the first rod.

7. The vehicle body manufacturing apparatus according to claim 1, wherein the restricting jig comprises a first cylinder that extends outwardly obliquely and downwardly in a lateral direction of the vehicle body and is secured to a jig frame main body, and a rod that is moveable through an operation of the first cylinder, and
wherein the bendable locking member is provided on an end of the rod.

8. The vehicle body manufacturing apparatus according to claim 1, further comprising:
a slider configured to move the first frame member in the longitudinal direction, and a welding machine configured to be moved by the slider in the longitudinal direction and disposed above the first frame member.

9. The vehicle body manufacturing apparatus according to claim 8, wherein the slider is configured to move a post that supports the first frame member and a rack that supports the welding machine.

* * * * *